United States Patent [19]

MacMullan

[11] Patent Number: 5,476,280
[45] Date of Patent: Dec. 19, 1995

[54] RETRACTABLE TOWING SYSTEM

[76] Inventor: John P. MacMullan, 802 S. 80th Ave., Yakima, Wash. 98908

[21] Appl. No.: 308,753

[22] Filed: Sep. 19, 1994

[51] Int. Cl.$^6$ ....................................................... B60D 1/18
[52] U.S. Cl. ................................... 280/480.1; 242/379.2; 280/480
[58] Field of Search ................................ 280/480, 480.1, 280/482, 485, 490.1, 492, 406.1, 292; 242/379.2

[56] References Cited

U.S. PATENT DOCUMENTS

| | | |
|---|---|---|
| 581,309 | 4/1897 | Savell . |
| 675,453 | 6/1901 | Sturgess ................................. 280/292 |
| 1,473,211 | 11/1923 | Cowles ................................... 280/480 |
| 1,537,213 | 5/1925 | Wylie ..................................... 280/480 |
| 1,587,426 | 6/1926 | Schwier ................................. 280/480 |
| 1,591,686 | 7/1926 | Silva ...................................... 280/503 |
| 1,695,096 | 5/1927 | Hanses ................................... 280/480 |
| 2,194,623 | 3/1940 | Thompson ........................... 280/480.1 |
| 2,714,019 | 3/1952 | Williams et al. ....................... 280/480 |
| 3,000,652 | 9/1961 | Hawkins .............................. 280/406.1 |
| 3,881,751 | 5/1975 | Colby .................................... 280/480 |
| 4,407,460 | 10/1983 | Khudaverpian ...................... 242/379.2 |
| 4,635,953 | 1/1987 | Robertson et al. .................... 280/480 |
| 5,350,186 | 9/1994 | Hull et al. ............................ 280/480.1 |

*Primary Examiner*—Mitchell J. Hill
*Attorney, Agent, or Firm*—Stratton Ballew

[57] ABSTRACT

A retractable towing system which is mounted on the undercarriage of a vehicle, with the towline extending beneath the vehicle, secured at a secondary stress-bearing point near the rear of the towing vehicle, and attached to the object or vehicle to be pulled or towed.

19 Claims, 8 Drawing Sheets

RETRACTABLE TOWING SYSTEM

TECHNICAL FIELD

This invention relates to an apparatus for towing an object. More specifically, this invention relates to a retractable towing system which is mounted on the undercarriage of the towing vehicle, with the towline extending beneath the towing vehicle, secured at a secondary stress-bearing point near the rear of the towing vehicle, and attached to the object or vehicle to be pulled or towed.

BACKGROUND OF THE INVENTION

There are occassions when a general purpose vehicle is used to tow a second vehicle, or to pull a second vehicle out of a ditch or snowbank or other location from which the second vehicle cannot exit under its own power. A towing cable or chain is used to link the towing vehicle to the towed vehicle. However, conventional towing chains can be heavy, awkward and messy to use and store. As a result, attempts have been made to design a retractable towing cable which can be stored outside the vehicle. While these designs begin to address the problem of cable storage, certain shortcomings are evident.

U.S. Pat. No. 2,714,019 to J. L. Williams et al., discloses a retractable towing cable which is mounted to a vehicle. This type of design often presents a problem in that the attachment of the cable to the storage reel must bear the full stress on the towline. The attachment can break due to an inablility to withstand the substantial pressure exerted upon it. This results in potential damage to the vehicles involved, as well as potential injury to the person or people using the retractable cable.

U.S. Pat. No. 4,635,953 to Robertson et al. discloses a tow cable with a storage means. The storage means in this design is a flexible tube which mounts to the undercarriage of a vehicle. The tow cable is made of a semi-rigid material, which can be pulled out of the flexible tube for use, then simply pushed back in to the tube for storage. A collar prevents the cable from being pulled completely out of the tube. As with the '019 patent to Williams et al., the problem with this design lies in the connection of the cable to the towing vehicle. Continuous tension on the cable, or a sudden sharp tug, is likely to pull the cable out of the collar, resulting in damage or injury. Additionally, the tow cable of this design is limited in length to the length of the vehicle, making it impossible to extend the cable to longer lengths, as may be needed to pull a second vehicle from a ditch or other more distant location.

U.S. Pat. No. 3,881,751 to Colby discloses a retractable towing cable and storage means, which is permanently mounted to the frame of a vehicle. A collar on the towline prevents the towline from hyperextending. An abutment means for transferring stress from the towline to the vehicle frame is provided. This design is installed on the frame of the vehicle, requiring professional installation. The device of Colby makes no provision for adjusting the length of cable between the towing vehicle and the object being towed.

U.S. Pat. No. 1,695,096 to Hanses discloses a vehicle towing device comprising a metal strap coiled on a retracting wheel. This device is attached with a single lug to the rear of the towing vehicle, and, while retractable, is not entirely self storing.

SUMMARY OF THE INVENTION

A preferred object of this .invention is to provide a retractable towing system which can be attached to the exterior of a vehicle for ease of access and storage.

It is a further object of this invention to provide a retractable towing system capable of bearing substantial tension on the towing line.

It is yet an additional object of this invention to provide a retractable towing system which can be easily and inexpensively installed on a vehicle, either as standard equipment or as an aftermarket accessory.

In a preferred embodiment of this invention, a retractable towing system is provided which is attached to a towing vehicle, with the retractable towing system having a towline which, when extended and attached to a vehicle or object to be towed, is secured to the towing vehicle at an anchor point separate from the towline retraction and storage apparatus, thereby transferring the stress on the towline from the retraction and storage apparatus to the anchor point.

These and other objects and advantages will be made clear in the detailed description which follows.

BEST MODE OF CARRYING OUT THE INVENTION

The retractable towing system described in this application is installed on a first vehicle, which is then used to tow a second vehicle. The retractable towing system may also be used to pull objects other than vehicles. For example, the retractable towing system can be used to remove stumps or brush, or to anchor the vehicle on which it is installed to a stationary object while performing other maneuvers, such as using a powered winch to move a second vehicle or object.

Figure 1:
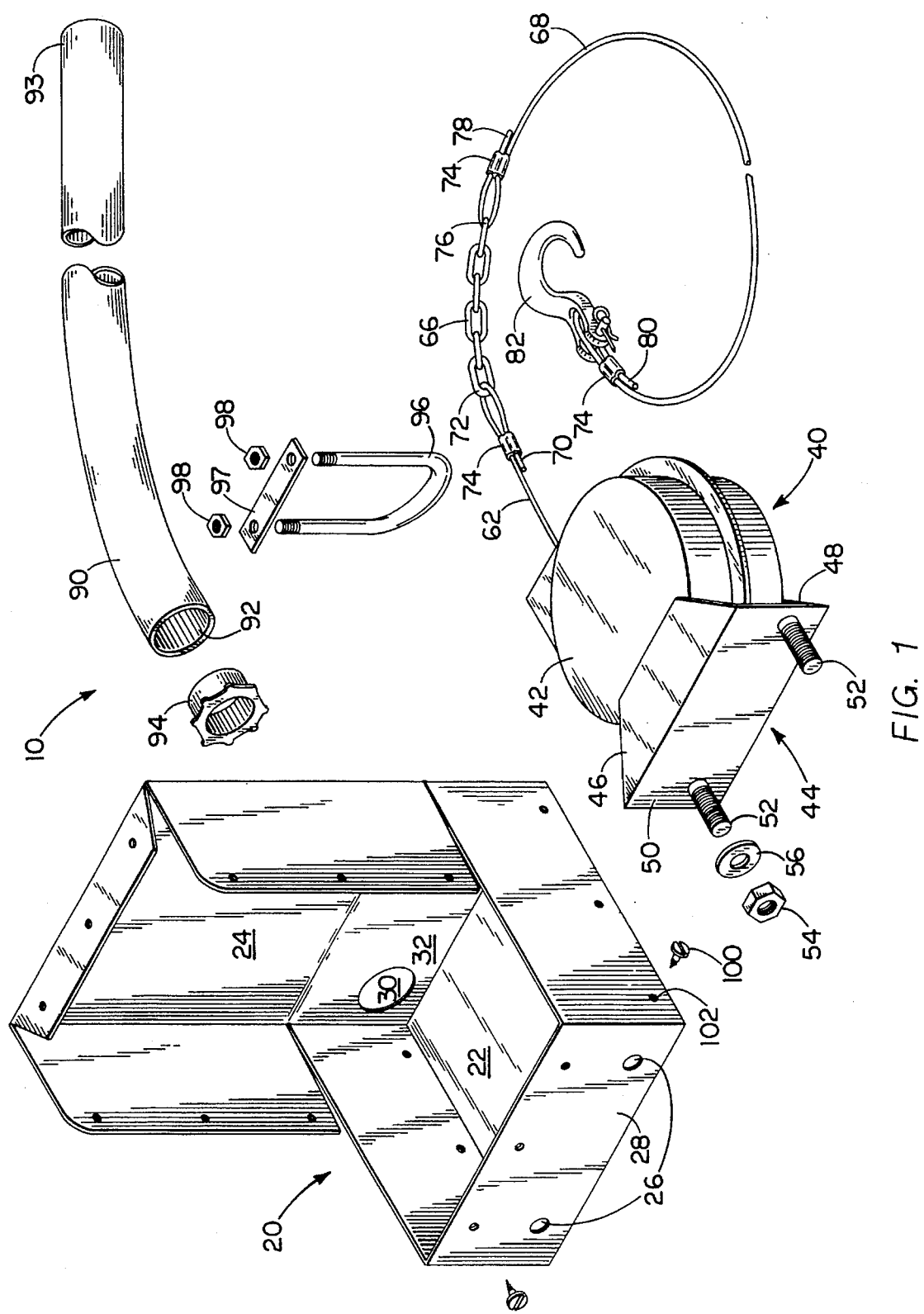
FIG. 1 is a partially exploded view of a retractable towing system.
Figure 2:
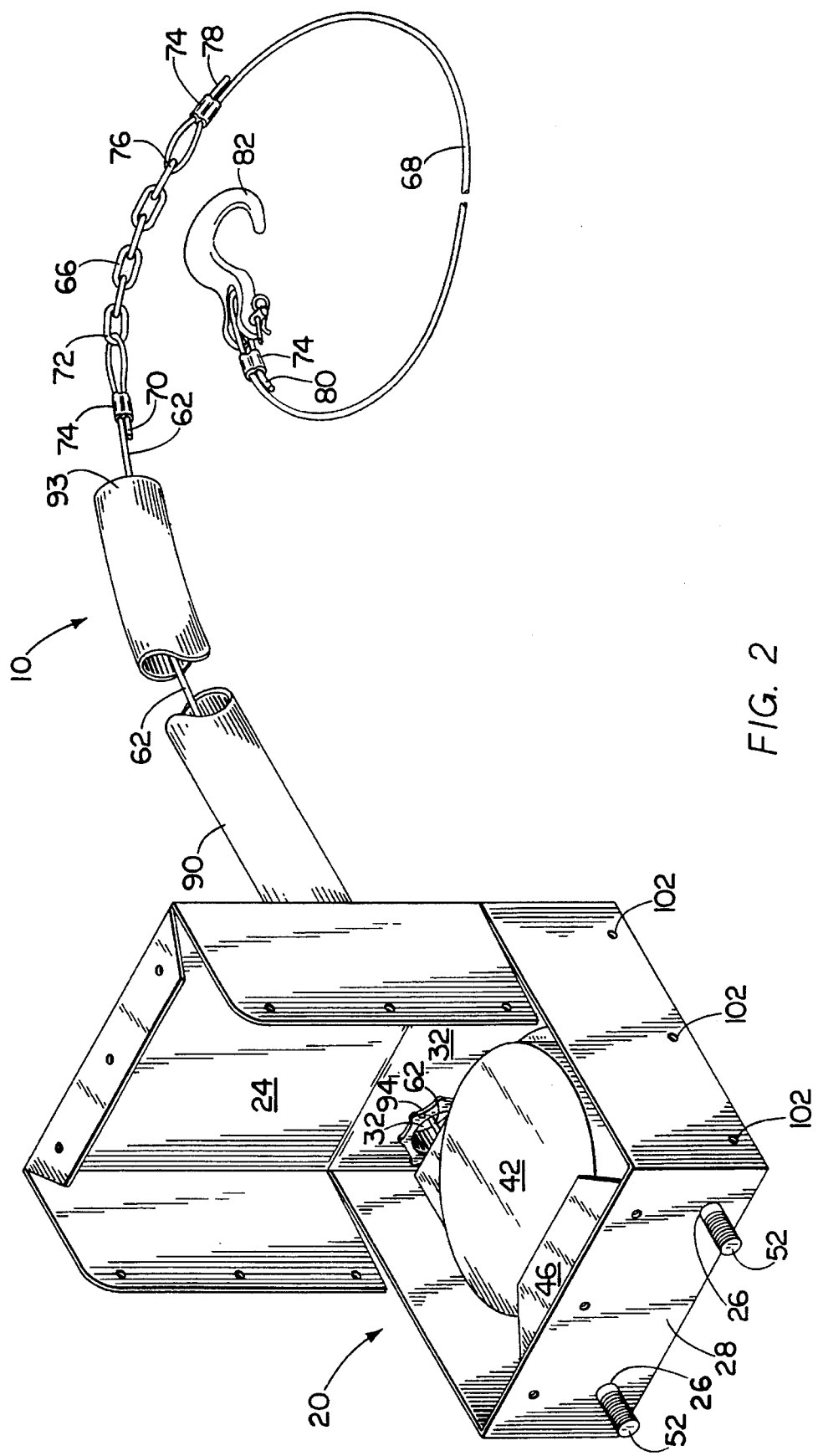
FIG. 2 is a perspective drawing of a retractable towing system.

In FIGS. 1 and 2, a towing system 10 is comprised of a protective case 20, having a base 22 and a cover 24, shown here in an open position. Bolt holes 26 are located in base first side 28, and tow line opening 30 is located in base second side 32. In a preferred embodiment of the invention, retraction means 40 is comprised of a spring wound reel (not shown) enclosed within reel housing 42. In other preferred embodiments of the invention, retraction means 40 is a hand cranked reel (not shown), a reel powered by an electric motor (not shown), a reel powered by a hydraulic motor (not shown), or a reel powered by the engine of the towing vehicle through a power take-off (not shown).

Mounting bracket 44 is affixed to reel housing 42, and has a first substantially horizontal planar surface 46, a second substantially horizontal planar surface 48, and a substantially vertical planar surface 50 which is between and perpendicular to planar surfaces 46 and 48, forming a [-shaped bracket. Attachment bolts 52 extend perpendicularly from vertical planar surface 50. Nut 54 and washer 56 are used to secure each attachment bolt 52 in place when the towing system 10 is assembled. Screw holes 102 in protective case 20 receive sheet metal screws 100, which secure the protective case 20 in the closed position (See FIGS. 3A and 3B).

Extending through an opening (not shown) in reel housing 42 is a tow line 60, comprised of first cable 62, chain 66, and second cable 68. The first cable first end (not shown) is secured to the spring wound reel (not shown). The first cable second end 70 is attached to chain first end 72 by forming a loop secured with a cable clamp 74. Second cable first end 78 is attached to chain second end 76 by forming a loop secured with a cable clamp 74. A hook 82 is attached to second cable second end 80 by forming a loop secured with a cable clamp 74.

Flexible conduit 90 is connected at its first end 92 to base second side 32 at tow line opening 30 by means of a conduit connector 94. ∪-bolts 96 and nuts 98 hold flexible conduit 90 in place on the undercarriage of the vehicle (not shown) on which the towing system 10 is installed.

Figure 3A:
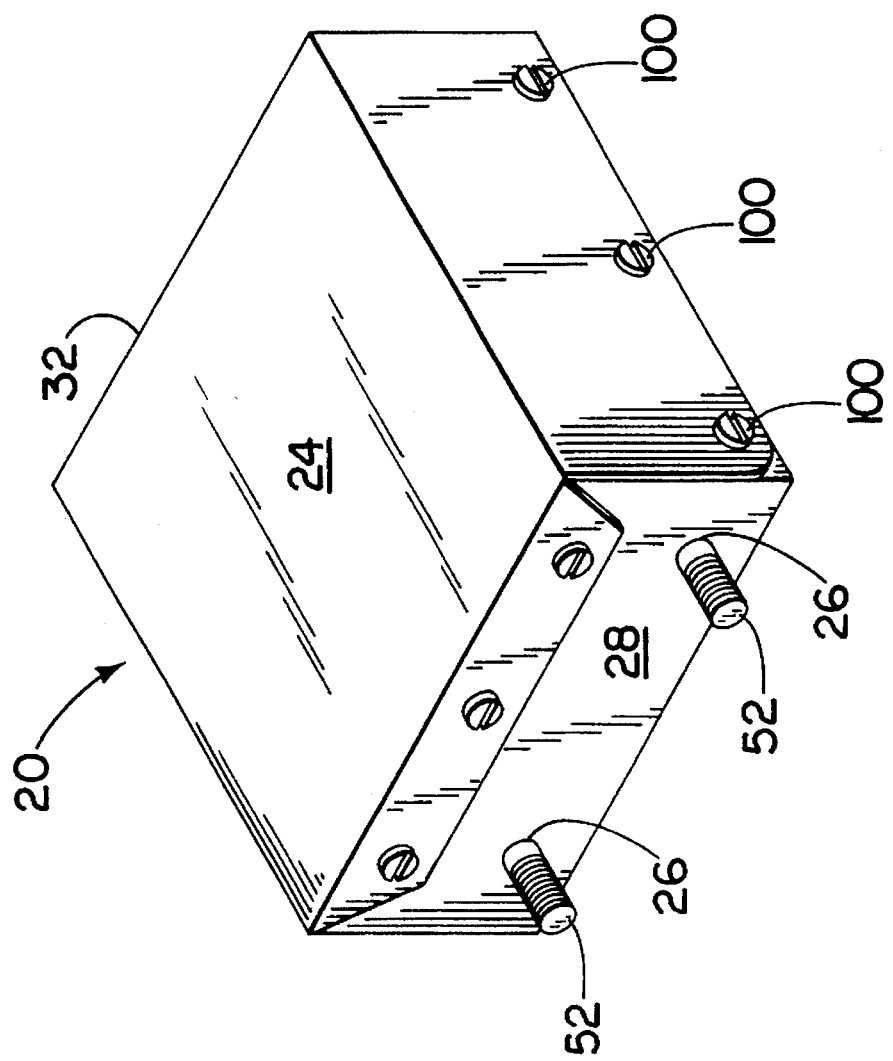
FIG. 3A is a perspective drawing of a protective case for a retractable towing system.
Figure 3B:
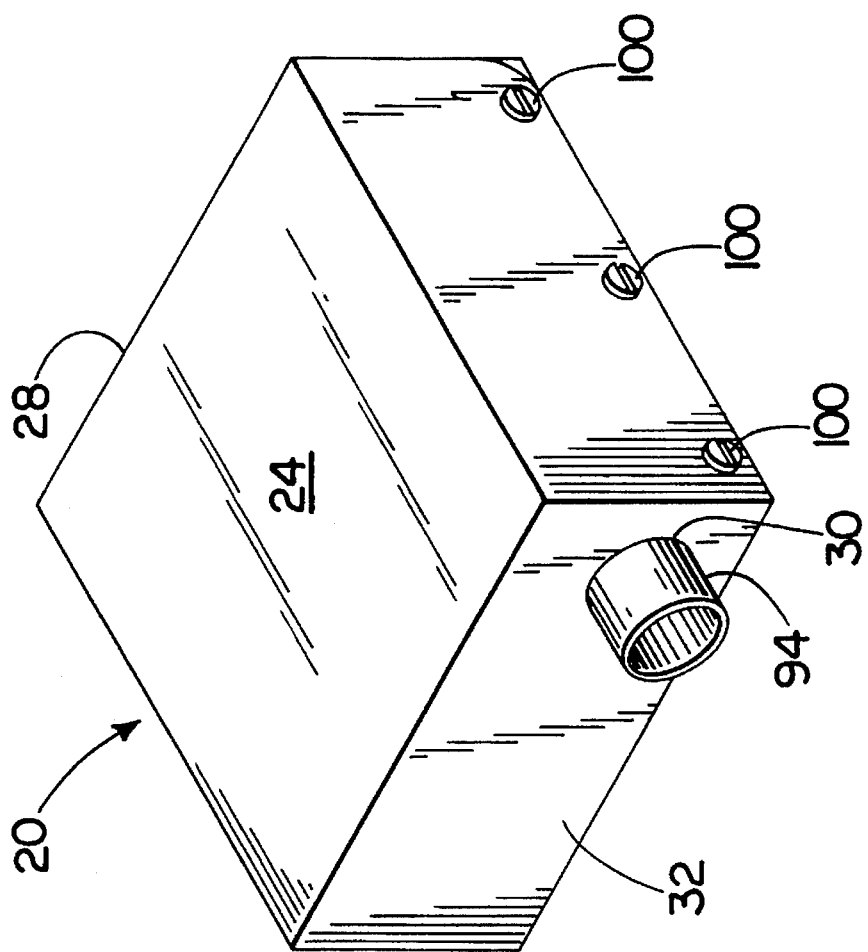
FIG. 3B is an additional perspective drawing of a protective case for a retractable towing system.

In FIGS. 3A and 3B, the towing system protective case 20 is shown in the closed position, enclosing the retraction means (See FIGS. 1 and 2, no. 40). In FIG. 3A, attachment bolts 52 extend through bolt holes 26 in protective case first side 28. In FIG. 3B, conduit connector 94 protrudes through tow line opening 30 of protective case second side 32. Sheet metal screws 100 secure protective case 20 in the closed position.

Figure 4:
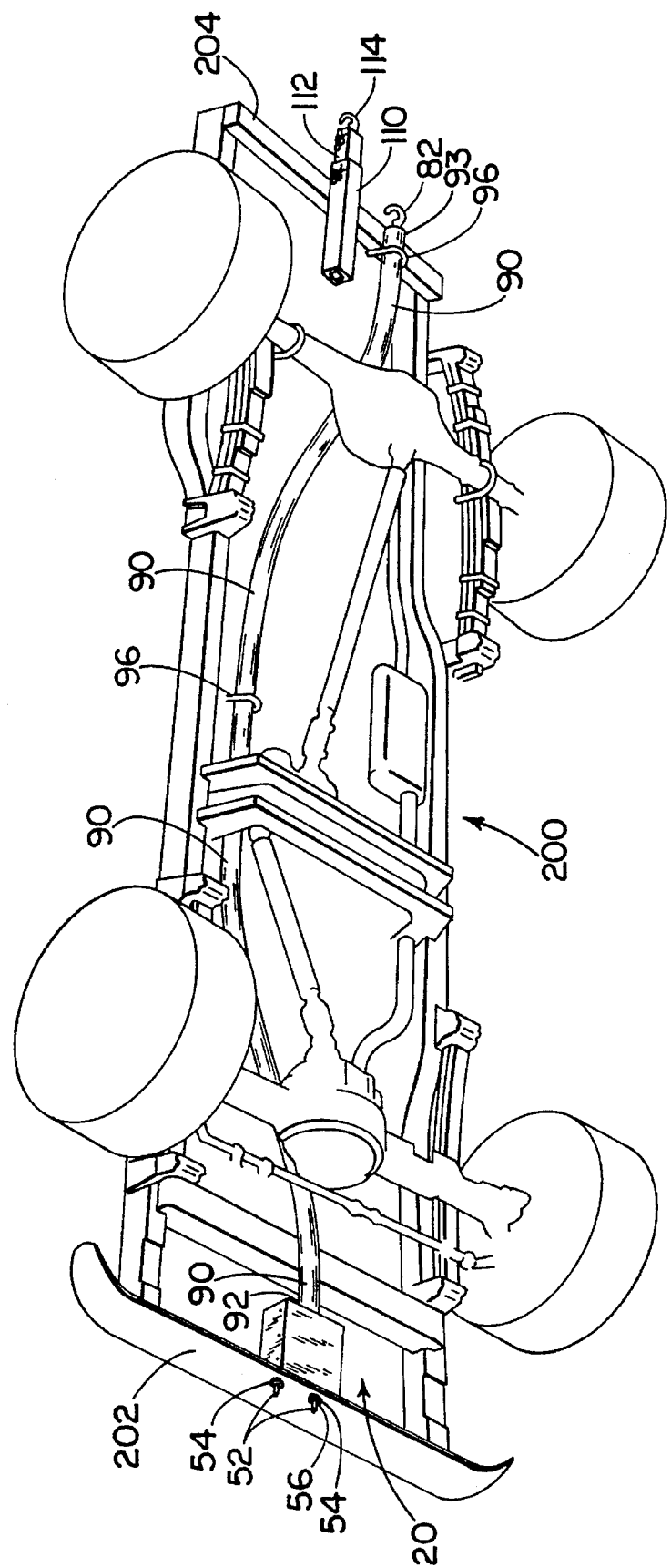
FIG. 4 is a perspective drawing of a vehicle undercarriage with a retractable towing system attached.

In FIG. 4, the towing system 10 is pictured as installed on a vehicle undercarriage 200. Protective case 20 is affixed to vehicle front bumper 202 with attachment bolts 52, nuts 54 and washers 56. First end 92 of flexible conduit 90 is connected to protective case 20 via conduit connector 94 (See FIGS. 1, 2, and 3B). Flexible conduit 90 extends from the protective case 20, along the vehicle undercarriage 200, where it is secured at a plurality of points by ∪-bolts 96, plates 97 and nuts 98.

Tow line hook 82 protrudes from second end 93 of flexible conduit 90 at the rear bumper 204 of vehicle undercarriage 200. Hook 82 at its widest point is wider than the diameter of flexible conduit 90, thus making it impossible for the hook to retract into the conduit and out of reach.

An under-car receiver 110, commonly used to support trailer hitches and similar accessories, is securely mounted to rear bumper 204. An anchor hook 114 is mounted to tongue 112, which fits slidably in under-car receiver 110.

In an alternative preferred embodiment (not shown), anchor hook 114 is mounted directly to the vehicle bumper, eliminating the need for under-car receiver 110.

In additional alternative preferred embodiments, anchor hook 114 is replaced with a peg or bolt configuration (not shown) which serves as an anchor point. In one alternative embodiment, a peg protrudes upwardly from the substantially horizontal planar surface of the vehicle bumper or from tongue 112. Link 67 of chain 66 is placed over the peg, and secured in place by inserting a cotter pin or similar pin into a substantially perpendicularly oriented hole in the upper portion of the peg.

In another preferred embodiment (not shown), a hole is located in the substantially horizontal planar surface of the vehicle bumper or tongue 112. A bolt or peg having a head too large to pass through link 67 of chain 66 is threaded through link 67, and then through the hole. The bolt or peg is secured in position with a nut or cotter pin, preventing the chain 66 from slipping off the peg.

Figure 5A:
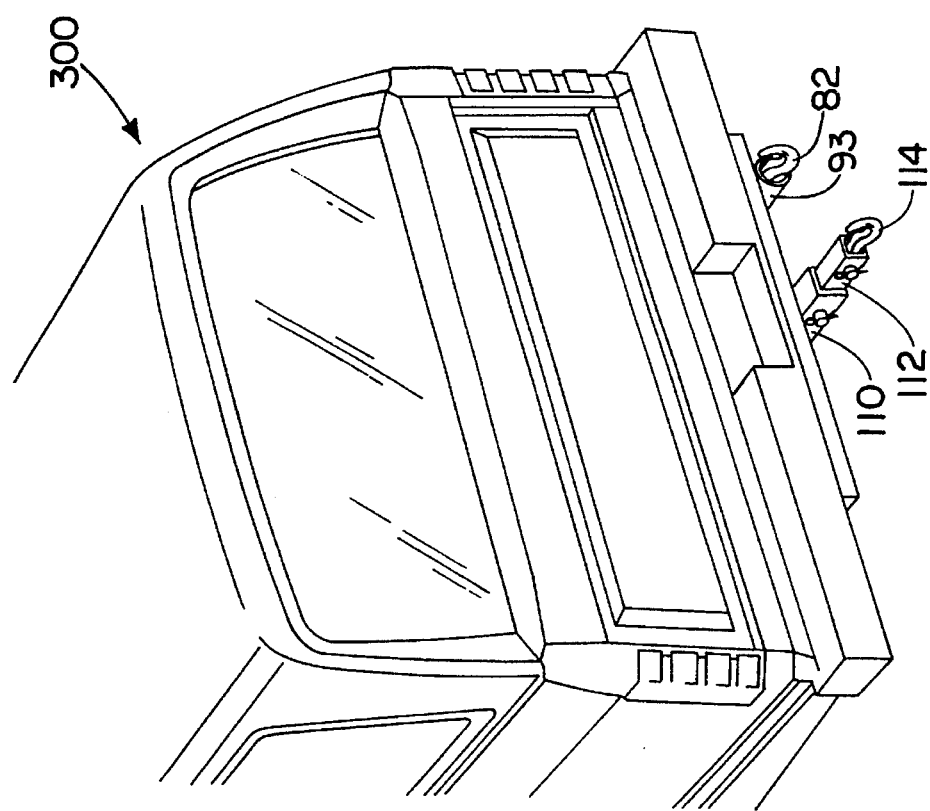
FIG. 5A is a perspective drawing of a vehicle with a retractable towing system attached, shown in the retracted position.
Figure 5B:
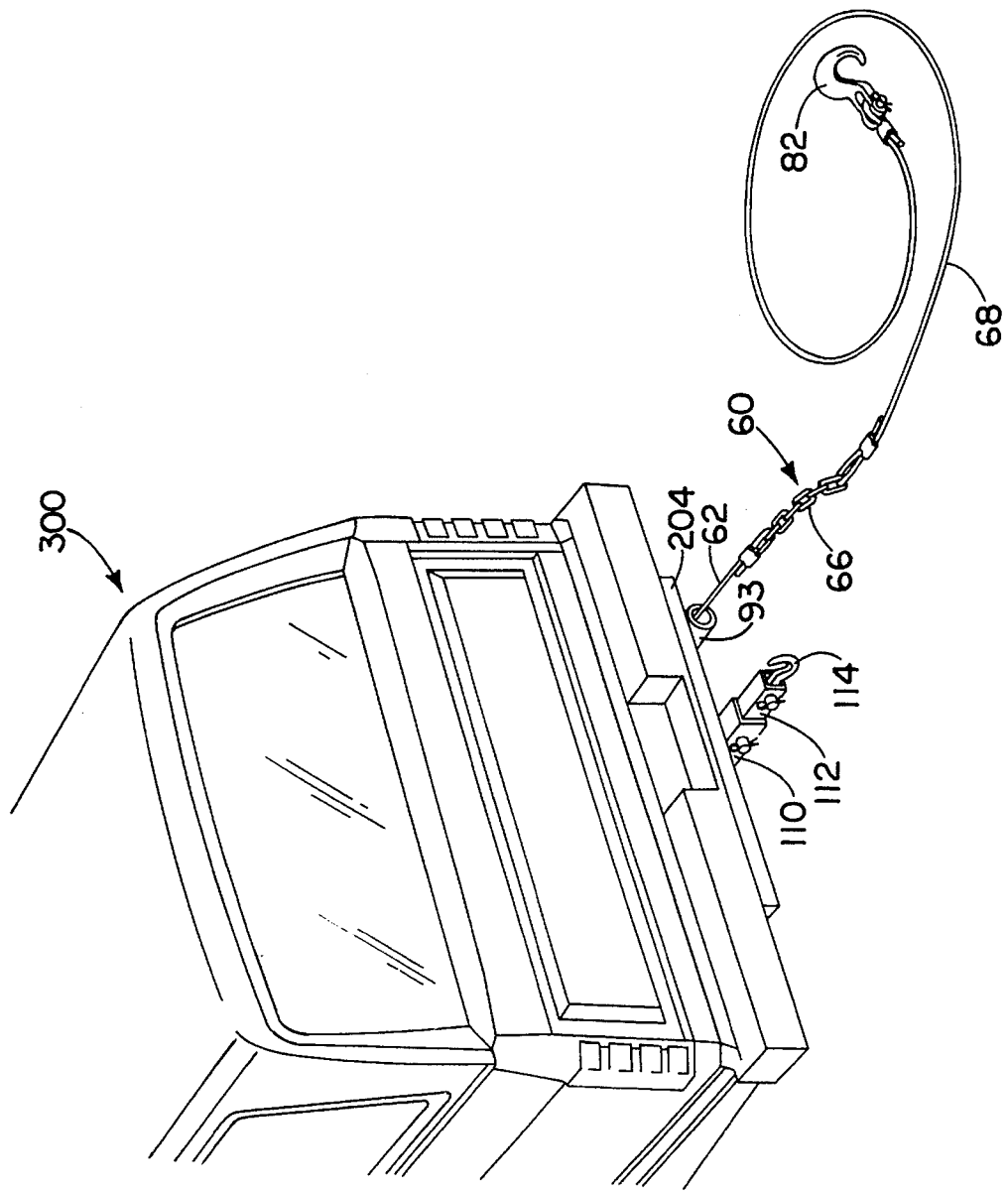
FIG. 5B is a perspective drawing of a vehicle with a retractable towing system attached, shown in the extended position.

In FIGS. 5A and 5B, a portion of towing system 10 is visible from the rear of a vehicle 300. An anchor hook 1214 is mounted to tongue 112, which fits slidably in under-car receiver 110. In FIG. 5A, tow line hook 82 protrudes from second end 93 of flexible conduit 90 at the rear bumper 204 of vehicle 300. Tow line 60 (not shown) is wound on the retracting means (not shown). In FIG. 5B, tow line 60 is shown in an extended position, with first cable 62, chain 66, and second cable 68 visible.

Figure 6:
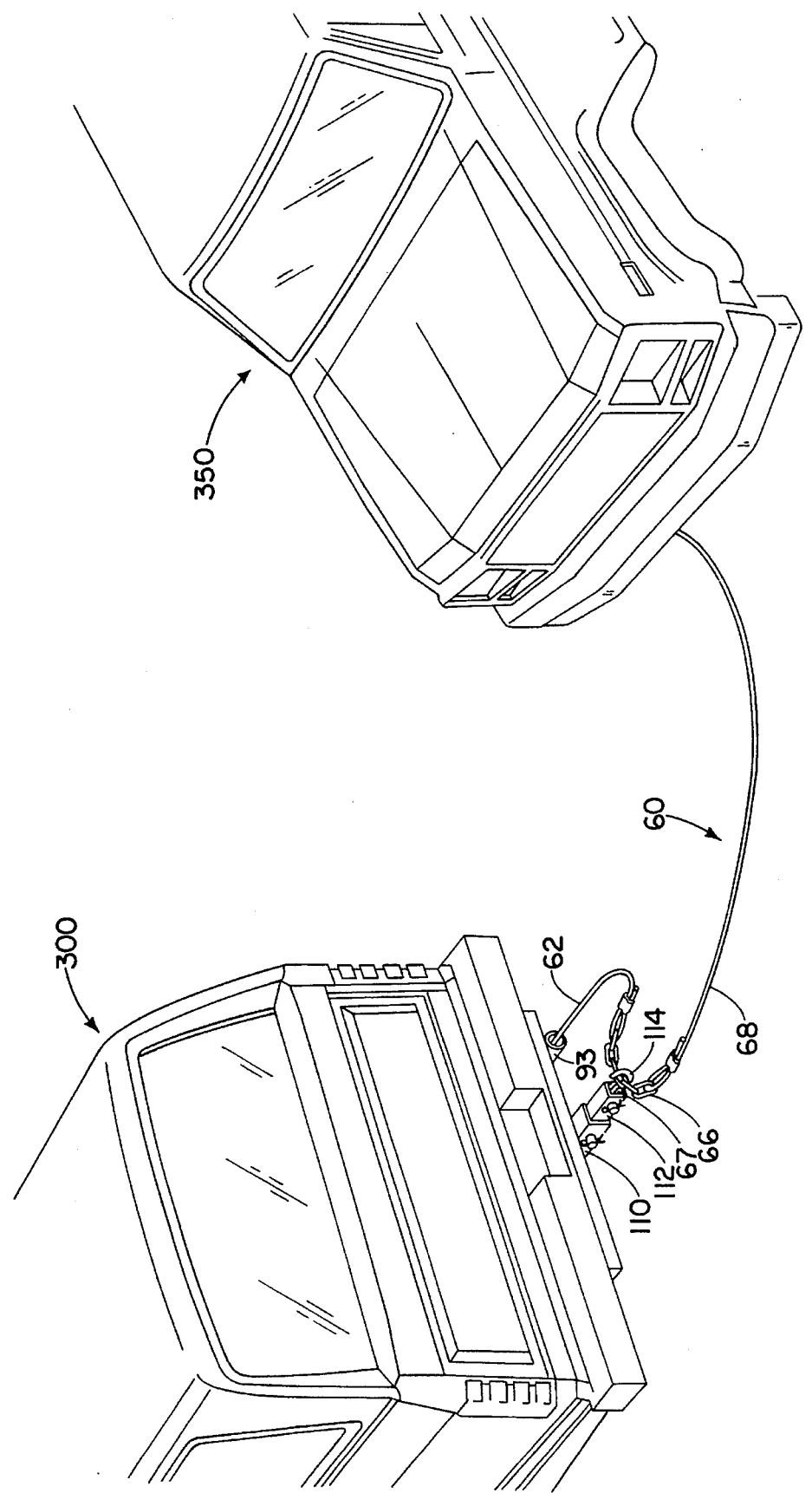
FIG. 6 is a perspective drawing of a vehicle with a retractable towing system attached, shown in the extended and secured position, and attached to a second vehicle for towing.

In FIG. 6, the towing system 10 is mounted to a towing vehicle 300, and is being used to tow a second vehicle 350. Tow line 60 has been extended so that first cable 62, chain 66, and second cable 68 are exposed. A link 67 of chain 66 is securely engaged on anchor hook 114. Second cable 68 of tow line 60 is extended back to second vehicle 350 where it is secured to the undercarriage via hook 82. When the towing vehicle 300 is driven forward, tow line 60 becomes taut between anchor hook 114 and second vehicle 350, thus transferring the stress on tow line 60 to anchor hook 114, tongue 112, and under-car receiver 110. First cable 62 of tow line 60 remains taut due to the tension exerted by the retraction means 40 (see FIG. 1) mounted at the front of the vehicle 300. In all preferred embodiments of this invention, retraction means 40 is protected from all towing generated stress by use of anchor hook 114 or other anchor point (not shown).

To use the towing system 10, the user grasps hook 82, which is protruding from second end 93 of flexible conduit 90, and pulls to extend towline 60 far enough that chain 66 is exposed (See FIGS. 5A, 5B, and 6). The user then secures a link 67 of chain 66 to anchor hook 114, thereby preventing the towline 60 from retracting back into the storage position. Once the towline is secure, hook 82 is securely attached to the vehicle or object to be towed. This can be accomplished in several ways. On a vehicle, a loop is often provided on the undercarriage, for receiving a tow hook. If a loop is not available, the cable may be looped around an axle or bumper, using the hook to secure the cable in place. The user can now put the towing vehicle 300 in gear, and increase the distance between the towing vehicle 300 and second vehicle 350 or other object to be towed (not shown).

When the towing job is complete, the towing system 10 is returned to the retracted position shown in FIG. 5A by simply disengaging hook 82 from second vehicle 350, and link 67 of chain 66 from anchor hook 114. Retraction means 40 then rewinds towline 60 until hook 82 abuts second end 93 of flexible conduit 90. Tension from the spring wound reel (not shown) of retraction means 40 prevents towline 60 from unwinding without pull being exerted by the user.

In an alternative preferred embodiment (not shown), the retractable towing system described herein, and depicted in the drawings, is used in conjunction with a vehicle other than an automobile or pick-up truck. Examples of additional vehicles are: Snowmobiles, boats, ATVs (all terrain vehicles), motorcycles, tanks, tractors, and forklifts.

In compliance with the statutes, the invention has been described in language more or less specific as to structural features. While this invention is susceptible to embodiment in different forms, the drawings and text in the specification illustrate preferred embodiments of the invention, with the understanding that the present disclosure is to be considered an exemplification of the principles of the invention, and the disclosure is not intended to limit the invention to the particular embodiments described.

I claim:

1. An apparatus mountable to a first vehicle for towing an object, the first vehicle having a first end, a second end, a bumper mounted to the second end of the first vehicle, the apparatus comprising:

a protective case mounted to the first vehicle proximate the first end of the first vehicle, the protective case having a towline opening formed therein;

a conduit mounted to the first vehicle, the conduit having a first end proximate the towline opening of the protective case and a second end proximate the second end of the first vehicle;

a towline, the towline having a first end, a second end and means for engagement therebetween, the towline slidably received within the conduit, a portion of the towline proximate the first end thereof protruding from the first end of the conduit and received through the towline opening and within the protective case, a second portion of the towline proximate the second end thereof protruding from the second end of the conduit;

means for retracting the towline mountingly received within the protective case; and mounting means for selectively attaching a point of the towline between the first end and the second end thereof to a point on the first vehicle whereby tension in the towline due to towing is transmitted directly to the first vehicle, independently of the protective case and the retracting means.

2. The apparatus of claim 1 wherein the mounting means comprises:

a plurality of chain links formed in the towline between the first and the second ends thereof; and a means for engaging one of the plurality of links mounted on the first vehicle.

3. The apparatus of claim 2 wherein the engaging means comprises: an under-car receiver securely mounted to the bumper;

a tongue slidably mounted to the under-car receiver; and a hook mounted at a distal end of the tongue.

4. The apparatus of claim 2 wherein the engaging means comprises:

an anchor hook mounted to the bumper.

5. The apparatus of claim 2 wherein the engaging means comprises:

an under-car receiver securely mounted to the bumper;

a tongue slidably mounted to the under-car receiver; and a peg mounted at a distal end of the tongue, the peg extending vertically upward therefrom.

6. The apparatus of claim 2 wherein the engaging means comprises:

a peg mounted to the bumper having a substantially perpendicular hole defined therethrough; and a pin for being received through the hole of the peg.

7. The apparatus of claim 2 wherein the engaging means comprises:

a peg mounted to the bumper having a substantially perpendicular hole defined therethrough; and a pin for being received through the hole of the peg.

8. The apparatus of claim 1 wherein the retraction means comprises:

a spring wound reel.

9. An apparatus mountable to a first vehicle for towing an object, the first vehicle having a first end, a second end, a bumper mounted to the second end of the first vehicle, the apparatus comprising:

a protective case mounted to the first vehicle proximate the first end of the first vehicle, the protective case having a towline opening formed therein;

a conduit mounted to the first vehicle, the conduit having a first end proximate the towline opening of the protective case and a second end proximate the second end of the first vehicle;

a towline, the towline having a first end and a second end, the towline slidably received within the conduit, a portion of the towline proximate the first end thereof received within the protective case, a second portion of the towline proximate the second end thereof protruding from the second end of the conduit, a third portion of the towline between the first and second portions of the towline comprising a plurality of chain links;

means for retracting the towline mountingly received within the protective case; and means for engaging a chain link of the towline, the engaging means mounted on the first vehicle at the second end thereof.

10. The apparatus of claim 9 wherein the mounting means comprises:

an under car receiver securely mounted to the bumper;

a tongue slidably mounted to the under-car receiver; and a hook mounted fixed at a distal end of the tongue.

11. The apparatus of claim 9 wherein the mounting means comprises:

an anchor hook mounted to the bumper.

12. The apparatus of claim 9 wherein the mounting means comprises:

an under-car receiver securely mounted to the bumper;

a tongue slidably mounted to the under-car receiver; and a peg mounted at a distal end of the tongue, extending vertically upward therefrom.

13. The apparatus of claim 12 wherein the mounting means further comprises:

a pin for being received through a substantially perpendicular hole defined in the peg.

14. The apparatus of claim 9 wherein the mounting means comprises;

a peg mounted to the bumper.

15. The apparatus of claim 14 wherein the mounting means comprises:

a pin for being received through a substantially perpendicular hole defined in the peg.

16. A method of towing an object using a first vehicle and a towline, a protective case having a towline opening therein mounted at a first end of the first vehicle, means for retracting the towline mounted within the protective case, a conduit mounted to the first vehicle such that a first end of the conduit is proximate the towline opening of the case and a second end of the conduit is proximate the second end of the first vehicle, a means for engaging a portion of the towline between the first and the second ends thereof mounted to the first vehicle proximate the second end thereof, the towline having a first end and a second end, a plurality of chain links therebetween, the first end of the towline received within the protective case, the second end protruding from the second end of the conduit, the towline slidably received in the conduit for movement between a retracted position and an extracted position, means for securing mounted at the second end of the towline, the method of towing comprising the steps of:

first, extracting a length of the towline from the conduit;

engaging one of the chain links of the towline onto the engagement means such that the desired length of towline is exposed; securing the second end of the towline to the object; and moving the first vehicle in a direction substantially away from the object to be towed, whereby the object is towed, with strain in the towline transferred through the engagement means directly to the first vehicle without straining the protective case and retraction means.

17. The method of towing of claim 16 wherein the step of securing comprises:

operatively engaging a portion of the object with the securing means.

18. The method of towing of claim 16 wherein the step of securing comprises:

forming a loop at the second end of the towline, the loop formed about a portion of the object to be towed; and operatively engaging a portion of the towline with the securing means.

19. The method of towing of claim 16 further comprising the steps of:

after towing the object, disengaging the chain link from the engagement means;

then straightening the towline to remove the loop; and then retracting the towline.

\* \* \* \* \*